US008442295B2

(12) United States Patent
Sam

(10) Patent No.: US 8,442,295 B2
(45) Date of Patent: May 14, 2013

(54) ANTI-COUNTERFEITING / AUTHENTICATION

(75) Inventor: Jonathan Sam, Haverhill, MA (US)

(73) Assignee: Analogic Corporation, Peabody, MA (US)

(*) Notice: Subject to any disclaimer, the term of this patent is extended or adjusted under 35 U.S.C. 154(b) by 234 days.

(21) Appl. No.: 12/825,478

(22) Filed: Jun. 29, 2010

(65) Prior Publication Data

US 2011/0317905 A1 Dec. 29, 2011

(51) Int. Cl.
*G06K 9/00* (2006.01)
(52) U.S. Cl.
USPC .......................................... 382/135
(58) Field of Classification Search ............ 382/135
See application file for complete search history.

(56) References Cited

U.S. PATENT DOCUMENTS

| | | | | |
|---|---|---|---|---|
| 5,995,638 | A * | 11/1999 | Amidror et al. | 382/100 |
| 7,035,760 | B2 * | 4/2006 | Kobayashi et al. | 702/150 |
| 7,130,754 | B2 * | 10/2006 | Satoh et al. | 702/95 |
| 7,542,598 | B2 * | 6/2009 | Jones et al. | 382/135 |
| 7,702,380 | B1 * | 4/2010 | Dean | 600/426 |
| 8,081,815 | B2 * | 12/2011 | Kotake et al. | 382/154 |
| 8,243,099 | B2 * | 8/2012 | Ryu et al. | 345/632 |
| 2008/0181447 | A1 * | 7/2008 | Adams et al. | 382/100 |
| 2008/0266323 | A1 * | 10/2008 | Biocca et al. | 345/633 |
| 2009/0238361 | A1 * | 9/2009 | Anan et al. | 380/28 |
| 2009/0269286 | A1 * | 10/2009 | Walker | 424/10.2 |
| 2011/0198837 | A1 * | 8/2011 | Parrinello et al. | 283/75 |
| 2011/0298203 | A1 * | 12/2011 | Pan et al. | 283/67 |

OTHER PUBLICATIONS

Wikipedia, The Free Encyclopedia, Augmented reality, downloaded Jun. 24, 2010, 12 sheets, http://en.wikipedia.ortg/wiki/Augmented_reality.
Dairies, Stephen, Augmented Reality, Gadgets and Technology Products Examiner—examiner.com cleveland, Jun. 14, 2010, 4 sheets, http://image.examiner.com/x-13634-Gadgets-and-Technology-Products-Examiner~y2009m6d14-Augented-Reality.

* cited by examiner

*Primary Examiner* — Samir A. Ahmed
*Assistant Examiner* — Totam Le
(74) *Attorney, Agent, or Firm* — Driggs, Hogg, Daugherty & Del Zoppo Co., LPA

(57) ABSTRACT

A system includes an imager that images an object, which includes a marker that is visually obscured, a marker identifier that identifies markers in the image of the object, and an image processor that combines the image of the object and a visual representation for the identified marker into a combined image, wherein a presence of a visual representation for the marker included with the object in the combined image indicates the object is authentic. A method includes imaging an object that includes a visually obscured marker and generating an image of the object, identifying the marker in the image of the object, generating a combined image that includes the image of the object and a visual representation of the identified marker, presenting the combined image, wherein the object is authenticated as not counterfeit in response to the visual representation of the marker corresponding to a reference authentication marker for the object.

24 Claims, 5 Drawing Sheets

ANTI-COUNTERFEITING / AUTHENTICATION

TECHNICAL FIELD

The following generally relates to anti-counterfeiting/authentication and is described with particular application to combing real world imagery with virtual imagery to facilitate anti-counterfeiting/authentication measures.

BACKGROUND

Counterfeiting is the act of making an imitation (a counterfeit) of an object such as currency or private documents. Counterfeiting has been used with the intent to fraudulently pass the imitation off as the genuine object.

Anti-counterfeiting measures are constantly in development to protect both currency and certain documentation. As digital printing techniques emerged in the 80's and 90's, advances in digital color printing and increased resolutions have narrowed the technology gap between counterfeiters and law enforcement. The impact of this can be most easily seen in the redesigns of US Currency over the last ten years.

Additionally, new security techniques are constantly added such as security strips embedded in paper, use of holograms, color shifting ink as well as others. Each of these varies in effectiveness based on the technique and cost of implementation. The lifespan of their usefulness is also impacted by the advancement of reproduction technologies and how readily these become available to counterfeiters.

SUMMARY

Aspects of the application address the above matters, and others.

In one aspect, a system includes an imager that images an object, which includes a marker that is visually obscured, a marker identifier that identifies markers in the image of the object, and an image processor that combines the image of the object and a visual representation for the identified marker into a combined image, wherein a presence of a visual representation for the marker included with the object in the combined image indicates the object is authentic.

In another aspect, a method includes imaging an object that includes a visually obscured marker and generating an image of the object, identifying the marker in the image of the object, generating a combined image that includes the image of the object and a visual representation of the identified marker, presenting the combined image, wherein the object is authenticated as not counterfeit in response to the visual representation of the marker corresponding to a reference authentication marker for the object.

In another aspect, a computer readable storage medium encoded with instructions which, when executed by a processor of a computer, cause the processor to: authenticate an object is not a counterfeit based on augmented reality.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
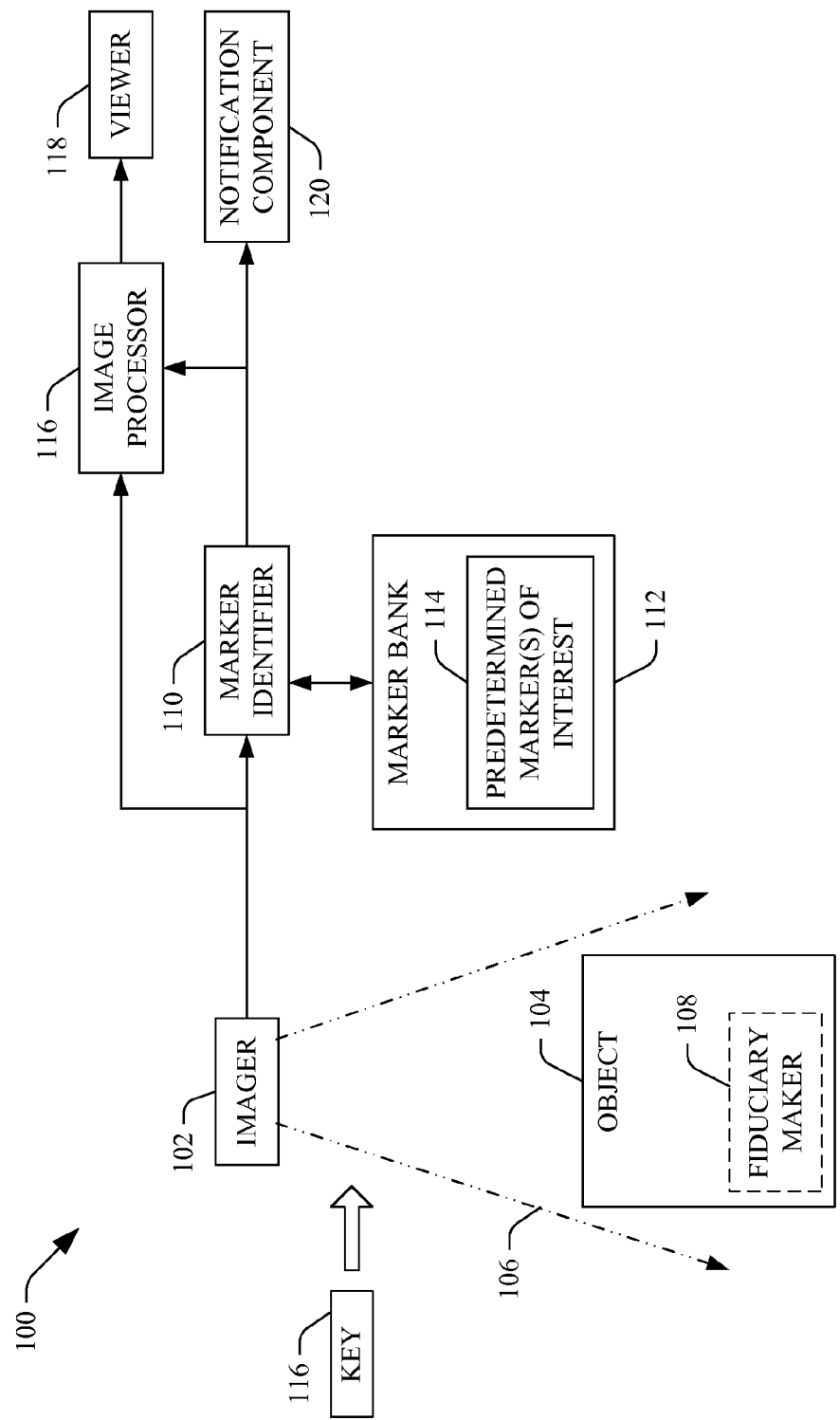
FIGS. 1-3 illustrate example apparatuses.

FIG. 1 illustrates an apparatus 100. The apparatus 100 is configured for at least anti-counterfeiting/authentication applications. In the illustrated embodiment, the apparatus 100 is configured to facilitate identifying whether an object is likely to be a counterfeit or authenticate. Suitable objects include, but are not limited to, currency, documents, logos, brands, clothes, and/or other objects.

The system 100 includes an imager 102 that generates an image (e.g., video and/or still) of an object 104 in an imaging region 106 of the imager 102. In the illustrated embodiment, the object 104 includes one or more fiduciary markers 108 that can be identified in the generated image. Suitable fiduciary markers include, but are not limited to, a pattern, a color, a symbol, a picture, and/or other fiduciary maker. In the illustrated embodiment, the marker is visually obscured (e.g., not visible, hidden, non-recognizable, etc.) to the human eye, and/or can be encrypted, encoded, or the like. Note that the illustrated number, location, and geometry of the fiduciary marker 108 of the object 104 are for explanatory purposes and are not limiting.

A marker identifier 110 identifies fiduciary markers in images such as images generated by the imager 102. In the illustrated embodiment, a marker bank 112 includes one or more predetermined markers of interest 114, and the marker identifier 110 identifies markers in images generated at least based on the one or more predetermined markers of interest 114 in the marker bank 112. The markers of interest 114 include a predetermined set of known authentic markers that can be used to authenticate the object 104. The marker identifier 110 generates a signal indicative of the identified marker.

The marker identifier 110 may also be configured to generate a signal indicating that a marker cannot be identified in connection with the object 104 and/or that an identified marker does not correspond to a marker in the markers of interest 114. As noted above, suitable markers include, but are not limited to, a pattern, a color, a symbol, part of a picture, and/or maker. The marker identifier 110 may also be configured to de-encrypt, de-code, etc. fiduciary markers that have been encrypted, encoded, etc. Using cryptology may mitigate identification of a fiduciary marker by non-authorized devices.

It is to be appreciated that one or more of the markers of interest 114 may be a combination of the fiduciary marker 108 and a key 116. By way of example, a marker of interest 114 may be a particular pattern that is formed when the key 116 is oriented in the imaging region 106 between the imager 102 and the object 104 such that the combination of the fiduciary marker 108 and the key 116 produce the marker of interest 114. In another embodiment, multiple keys 116 are utilized in combination with the marker 108. In another embodiment, individual keys 116 combine with the marker 108 to produce different ones of the markers 114 in the bank 112.

An image processor 116 generates an image (e.g., video and/or still) at least based on the image output by the imager 102 and marker identified by the marker identifier 110. In the illustrated embodiment, the image processor 116 combine, superimposes, and/or otherwise merges the image output of the imager 102 and a representation for the marker identified by the marker identifier 110. By way of example, where the marker 108 is visually obscured, the image processor 116 produces an image with a representation of the marker 108 that visible and recognizable to the human eye. Where a marker is not identified, the image processor 116 can be configured to combine the image from the imager 102 with indicia indicating that a marker has not been identified.

As described in greater detail below, in one embodiment, the image processor 116 employs augmented reality to combine the image from the imager and the representation to produce an image that includes the live physical real-world and computer-generated imagery. For example, the image processor 116 may employ augmented reality to combine a live image of the object 104 with a computer-generated representation for the marker 108. Where the output of the marker identifier 110 indicates that a marker could not be identified, the image processor 116 may combine indicia indicating such with the image from the imager 102.

A viewer 118 such as a monitor, display, or the like is configured to present the combined image from the image processor 116 such that the image from the imager 102 and the marker are visible and recognizable to a human looking at the combined image via the viewer 118. The viewer 118 may be local or remote to the system apparatus 100, and more than one viewer 110 and/or other viewers can be employed to view such data. The viewer 118 can be configured to display information in 2D and/or 3D formats.

A notification component 120 can be used to send a notification indicating at least one of the marker identifier 120 did not identify a mark or the marker identifier 110 identified a mark. The notification can be sent via various communication channels, including, but not limited to, cell phone, telephone, pager, email, text message, instant message, and the like. The notification component 120 may also provide audible, tactile, and/or other notifications.

Employing the apparatus 100 for an anti-counterfeiting application may make it technically difficult to pass a counterfeit of the object 114, costly to counterfeit the object 114, etc.

It is to be appreciated that one or more of the components of the apparatus can be implemented by way of hardware and/or software. In one embodiment, the apparatus 100 includes one or more processors that execute one or more computer readable instructions embedded or encoded in computer readable storage medium to implement one or more of the components of the apparatus. In this embodiment, the storage medium may be local to and/or remote from the apparatus 100.

The apparatus 100 may be variously configured. For example, in one embodiment, the apparatus 100 is included in a hand held device. The device may be a dedicated device or a device such as a cell phone, a personal data assistant (PDA), a laptop computer, or the like. In another embodiment, the apparatus 100 may be portable and moveable, for example, via wheels, being carried, and/or otherwise. In yet another embodiment, the apparatus 100 is stationarily mounted.

Figure 2:
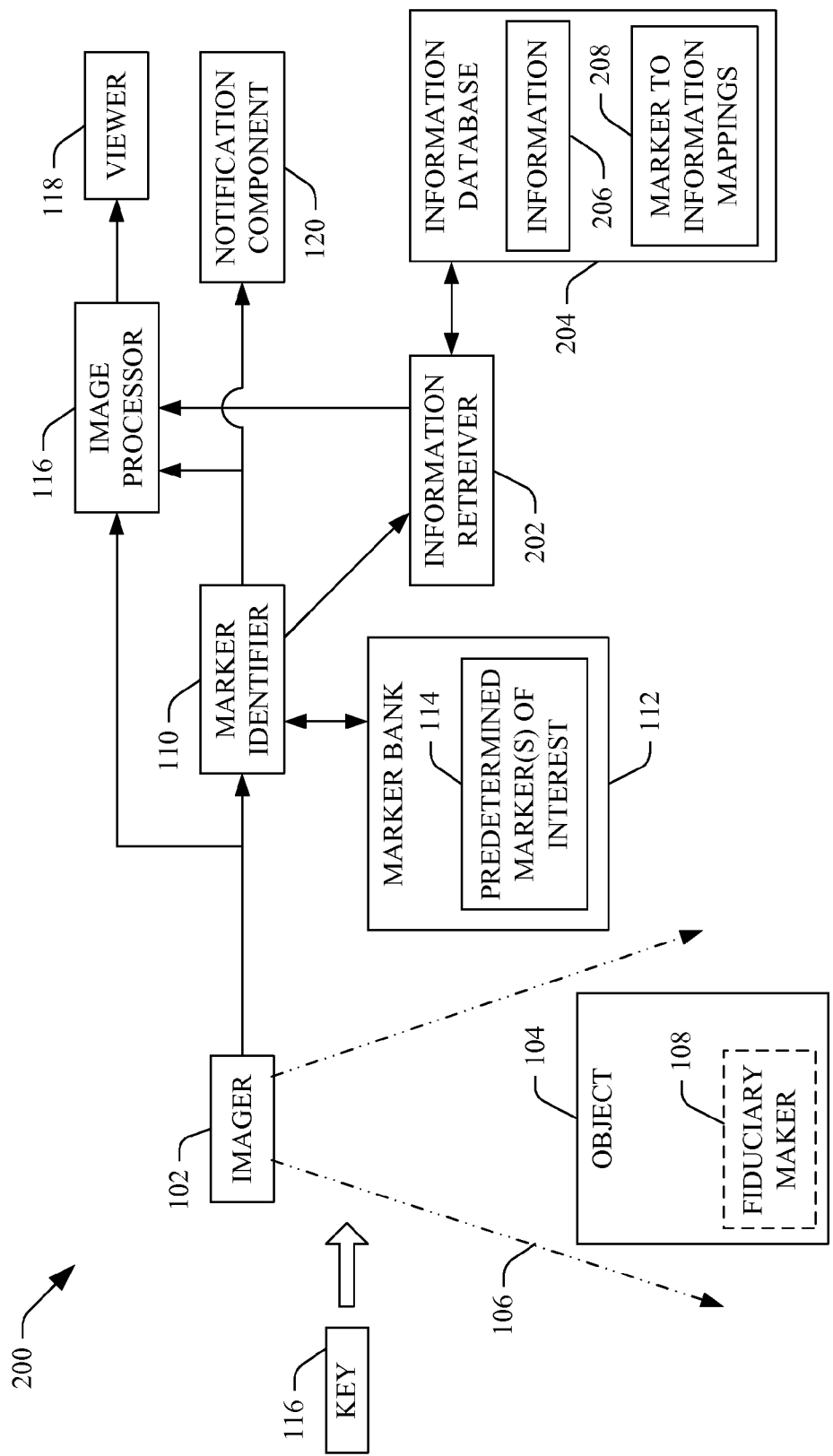

FIG. 2 illustrates an apparatus 200 which includes the apparatus 100 and other components.

An information retriever 202 retrieves information about an identified marker based at least on the identified marker from an information database 204. The illustrated database 204 includes information 206 and marker to information mappings 208, and the information 206 may include one or more of a pattern, a picture, text, a symbol, etc. To retrieve information, the information retriever 118 locates a corresponding mapping from the mappings 126 based on the identified marker, and retrieves the information corresponding to the mapping.

With this embodiment, the image processor 116 may additionally or alternatively generate an image by combining, superimposing, and/or otherwise merging the image output of the imager 102 and the representation, which, in the case, includes the information from the information retriever 118. The representation of the marker may also be combined with this image. Similar to FIG. 1, the additional components 202-208 may be implemented by way of hardware and/or software, as described herein.

Figure 3:
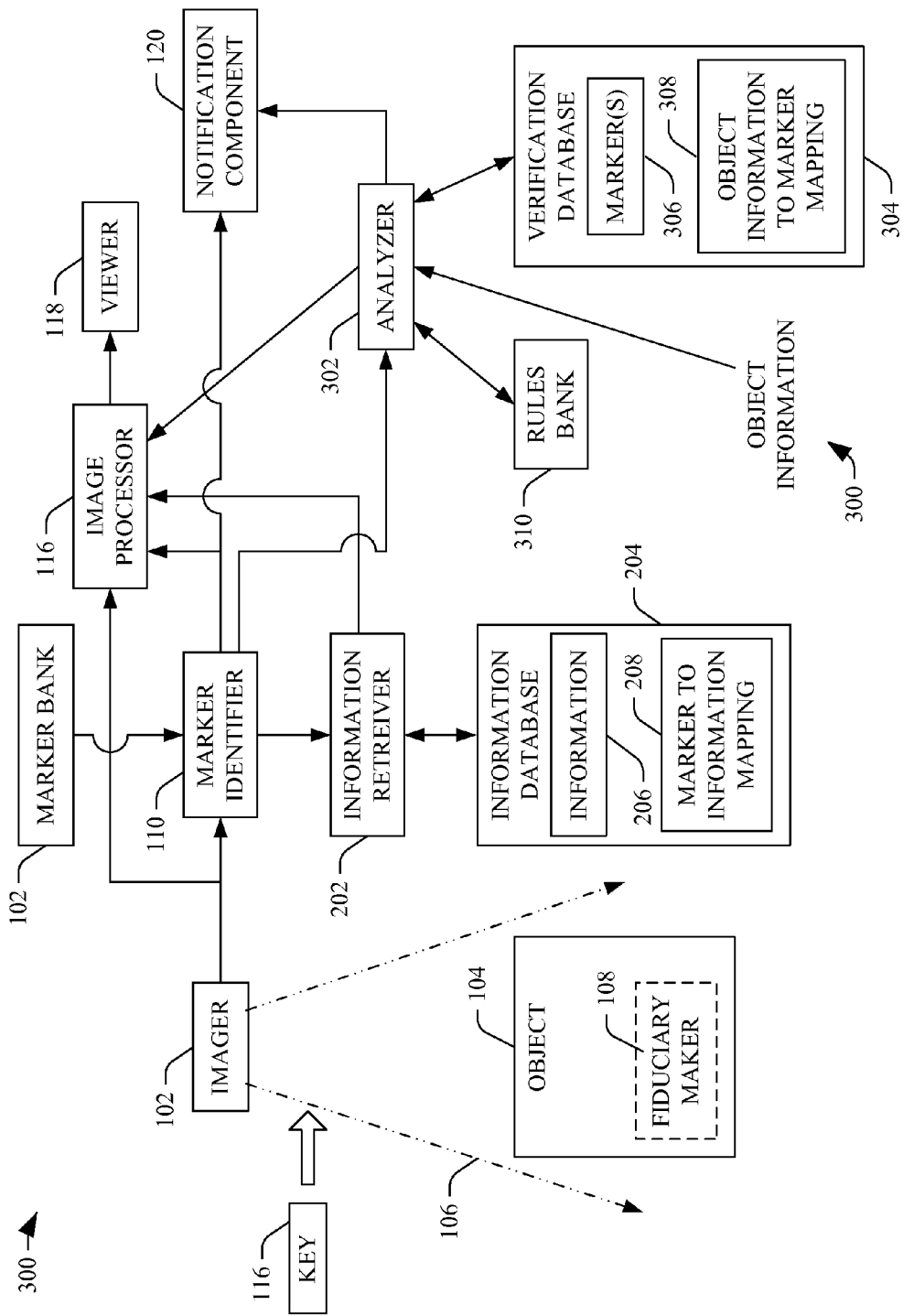

FIG. 3 illustrates an apparatus 300 which includes the apparatuses 100 and 200 and other components.

An analyzer 302 is configured to analyze the marker identified by the marker identifier 110 (if one is identified). A result of the analysis may be used to automatically determine whether the object 104 is counterfeit or authentic.

For this, in one instance, the analyzer 302 uses known object information 300 to retrieve an object information to marker mapping from a verification database 304, which includes object information to marker mappings 208 and markers 306. The analyzer 302 employs the mapping to identify a representation of the marker or the marker from the markers 306 for the object 104. The analyzer 302 then compares the identified marker with the marker for the object 104.

By way of non-limiting example, the object information 300 may indicate that the object is currency of a particular denomination. The mapping may lead to the particular marker utilized with the particular denomination. The particular marker is then compared with the identified marker. A successful match indicates that the object is authentic, whereas an unsuccessful match indicates a counterfeit.

A rules bank 310 provides a set rules or actions (including no action) for the analyzer 302. The analyzer 302 obtains a suitable rule from the rules bank 310 based on the results of the analysis. The rules may suggest that a notification be sent by the notification component 120, that certain information should be combined with the image via the image processor 116 and displayed on by viewer 118, etc.

Similar to FIGS. 1 and 2, the additional components 302-310 may be implemented by way of hardware and/or software, as described herein.

Figure 4:
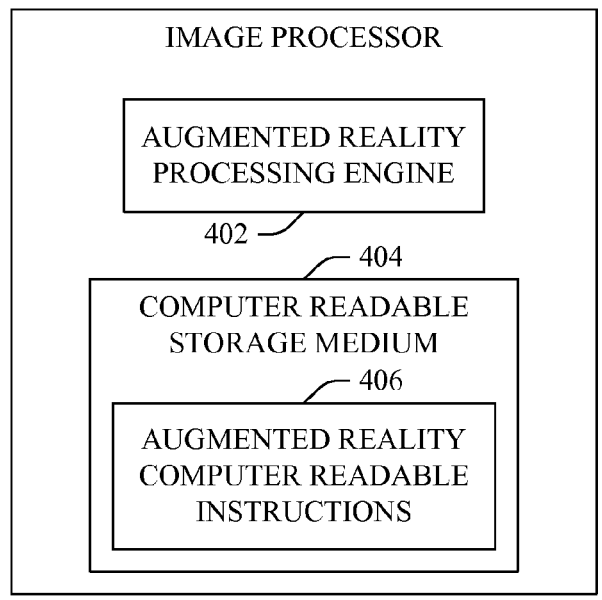
FIG. 4 illustrates an example image processor of the example apparatuses.

FIG. 4 illustrates an example image processor 116. In this embodiment, the image processor 116 employs augmented reality (combining the live physical real-world and computer-generated imagery). In other embodiments, other approaches are employed, including but not limited to, other approaches for merging the real world with the virtual world.

The illustrated image processor 116 includes an augmented reality processing engine 402 (with one or more processors) and computer readable storage medium 404 that includes one or more augmented reality computer readable instructions 406 that when executed by the one or more processors combine at least the image output of the imager 102 and the representation (of the marker and/or the retrieved information) to generate live video and/or one or more still images showing the image of the object 104 with the representation merged therewith.

In one embodiment, the image processor 116 registers and superimposes the information over the image from the imager 102. In one instance, the information is placed over the image over a region dedicated for the particular information. In another instance, the information is placed over the image at region dedicated for all information retrieved from the information database and/or other information. The resulting combined image, including the image and the information, can be used to authenticate the object, or determine whether it is a counterfeit or not.

Authentication can be achieved manually be a user comparing the visualized combination image with a predetermined reference authentication image. Alternatively, this can be achieved automatically via the analyzer 302, for example, based on information about the particular object and a prior knowledge (e.g., from the verification database 304) about the corresponding marker for the object and hence the information that is combined with that type of particular object.

Employing augmented reality as such may provide a unique means to merge physical and virtual modalities in anti-counterfeiting applications. This may not only increase the difficulty of imitating the object 104 but also allows the addition of crypto logical methods to further make a counterfeiter's job more difficult.

For anti-counterfeiting applications, at one layer, the fiduciary marker 108 would be printed on the object 104 and would render a particular shape when viewed through the viewer 118, indicating the object 104 was authentic. Other levels of anti-counterfeiting layers can concurrently be employed.

By way of example, in one instance another layer of security can be achieved by incorporating the fiduciary marker 108 in a design of the object 104 so that it is not readily obvious, the colors are difficult to print, and/or the patterns are not easily recognizable to the human eye.

Additionally or alternatively, another layer of security can be added by requiring user of the key 116 or other physical object that interacts with the fiduciary marker 108 and influences the image produced by the imager 110. With the approach, authentication can be determined by how the physical object interacts and influences the image.

Additionally or alternatively, another layer of security can be added by adding one or more different sets of colors to one or more different keys 116 where one or more predetermined colors of the keys 116 interact with the fiduciary marker 108 in different ways, and/or other colors do not interact with the fiduciary marker 108.

Additionally or alternatively, another layer of security can be added by incorporating multiple different fiduciary markers in the object 104. With this embodiment, certain levels of access, along with the appropriate cryptology, would activate different images or act as a secondary means of authentication in case one of the previous levels was breached.

Additionally or alternatively, another layer of security can be added by having some action by the user influence how the imager 102 images the fiduciary marker 108. For example, in one instance, the user may have to move the key 116 in the examination region 106 based on a predetermined pattern in order for the imager 102 to acquire an image in which the marker can be identified.

Figure 5:
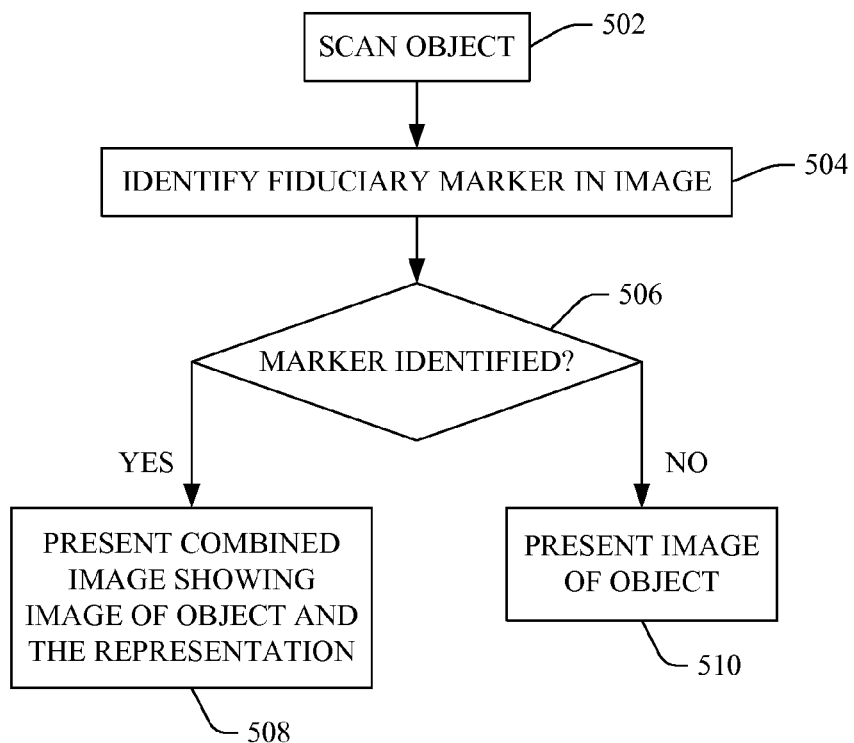
FIGS. 5-6 illustrate non-limiting methods.

FIG. 5 illustrates a method for facilitating authenticating the object 104.

At 502, the object 104 is scanned, producing an image (video and/or still) of the object.

At 504, the image is processed to identify a fiduciary marker included with the object 104.

At 506, it is determined whether the fiduciary marker is identified in the image of the object.

If so, then at 508, a combined image showing the image of the object and a representation for the marker is presented.

If not, then at 510, the image of the object is presented. Optionally, indicia indicating that a marker has not been identified may be combined with the presented image of the object. Where a marker other than the predetermined fiduciary marker is identified, this other marker may or may not be displayed with the image of the object.

Figure 6:
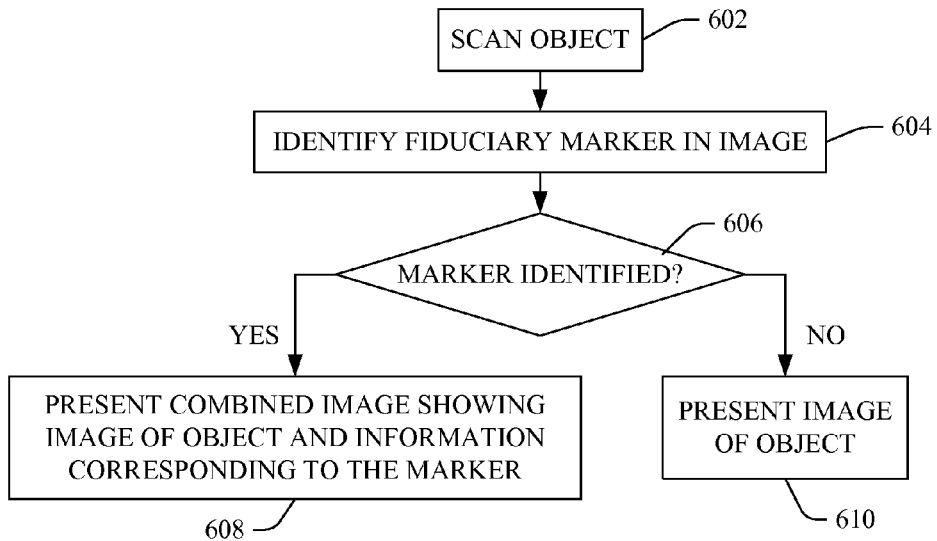

FIG. 6 illustrates a method for facilitating authenticating the object 104.

At 602, the object 104 is scanned, producing an image of the object.

At 604, the image is processed to identify a fiduciary marker included with the object 104.

At 606, it is determined whether the fiduciary marker is identified in the image of the object.

If so, then at 608, a combined image showing the image of the object and information (from the database 204) corresponding to the identified marker is presented.

If not, then at 610, the image of the object is presented. Likewise, optionally, indicia indicating that a marker has not been identified may be combined with the image of the object, and where a marker other than the predetermined fiduciary marker is identified, that marker may or may not be displayed with the image of the object.

Figure 7:
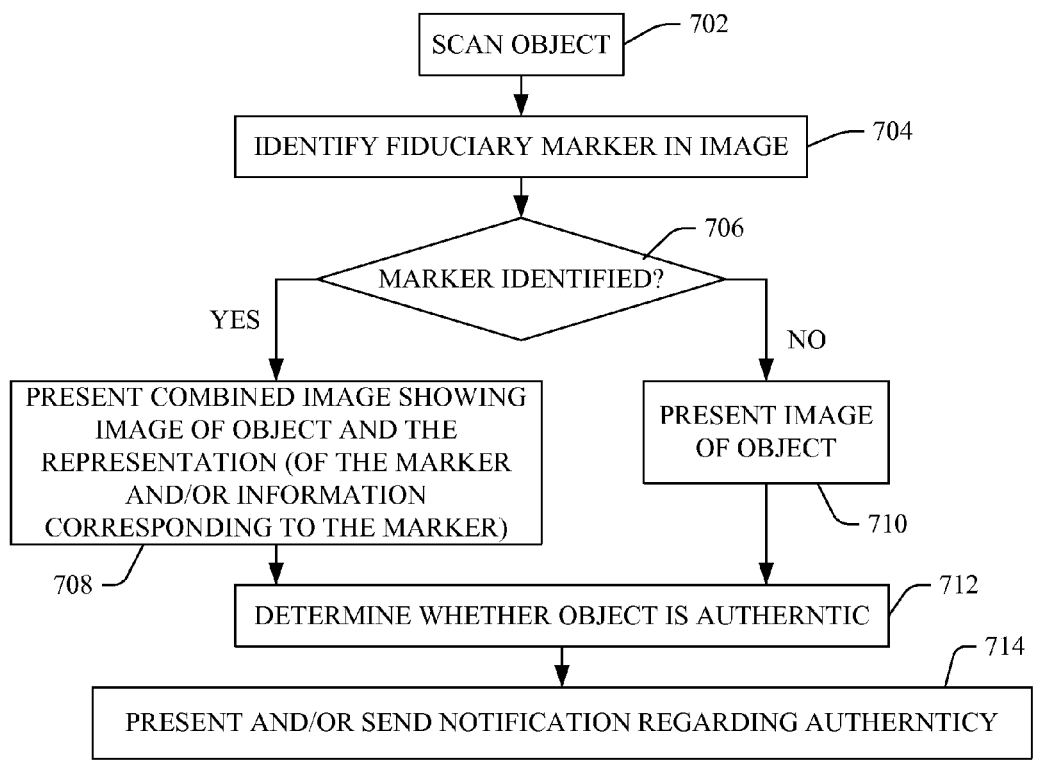

FIG. 7 illustrates a method for facilitating authenticating the object 104.

At 702, the object 104 is scanned, producing an image of the object.

At 704, the image is processed to identify a fiduciary marker included with the object 104.

At 706, it is determined whether the fiduciary marker is identified in the image of the object.

If so, then at 708, a combined image showing the image of the object and the representation of the marker and/or the information corresponding to the identified marker is presented.

If not, then at 710, the image of the object is presented. Again, optionally, indicia indicating that a marker has not been identified may be combined with the image of the object, and where a marker other than the predetermined fiduciary marker is identified, that marker may or may not be displayed with the image of the object.

At 712, it is determined whether the object 104 is authentic or counterfeit based on the identified marker and/or the information retrieved for the identified marker and a priori information about the marker for the object 104.

At 714, a notification indicating the object 104 is authentic or counterfeit can be presented via the viewer 118 and/or sent to a remote device to notify authorized personnel.

It is to be appreciated that the methods herein can be implemented via one or more processor of one or more computing systems executing one or more computer readable and/or executable instructions stored on computer storage medium such as memory local to or remote from the one or more computing systems.

It is to be appreciated that the ordering of the acts in the methods described herein is not limited. As such, in other embodiments, the acts may occur in a different order. In addition, in other embodiments, one or more additional acts may be included and/or on or more acts by be omitted.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A system that facilitates authenticating objects, comprising:
   an imager that images an object, which includes a marker that is visually obscured and no encoded information, generating an image of the object;
   a marker identifier that identifies the visually obscured marker in the image of the object;

an image processor that combines the image of the object and a visual representation for the identified visually obscured marker into a combined image and visually presents the combined image, wherein the object is authenticated as not counterfeit in response to the visual representation of the visually obscured marker corresponding to a reference authentication marker for the object.

2. The system of claim 1, wherein absence of the visual representation for the marker included with the object in the combined image indicates the object is a counterfeit.

3. The system of claim 1, wherein the marker included with the object includes one or more of pattern, a color, a symbol, or a picture.

4. The system of claim 1, wherein the image processor employs augmented reality to combine an image of the object with a computer-generated representation for the marker.

5. The system of claim 1, wherein the image processor visually presents the image of the object when the marker identifier is unable to identify the marker in the image of the object.

6. The system of claim 1, wherein the image processor presents indicia indicating that the marker identifier is unable to identify the marker in the image of the object when the marker identifier is unable to identify the marker in the image of the object.

7. The system of claim 1, further comprising:
an information retriever that retrieves information corresponding to the identified marker, wherein the image processor combines the image of the object and the retrieved information to generate the combined image.

8. The system of claim 7, wherein the information includes one or more of a pattern, a picture, text, or a symbol.

9. The system of claim 7, wherein the image processor combines the image of the object, the identified marker, and the retrieved information to generate the combined image.

10. The system of claim 9, further comprising:
an analyzer that determines whether the object is authentic or a counterfeit based on at least one of an identified marker or retrieved information and information about the marker assigned to the object.

11. The system of claim 10, further comprising:
a notification component that transmits a notification indicating whether the object is authentic or counterfeit.

12. A method, comprising:
imaging an object that includes a visually obscured marker and no encoded information, and generating an image of the object;
identifying the visually obscured marker in the image of the object; generating a combined image that includes the image of the object and a visual representation of the identified visually obscured marker; and
presenting the combined image via a display, wherein the object is authenticated as not counterfeit in response to the visual representation of the visually obscured marker corresponding to a reference authentication marker for the object.

13. The method of claim 12, wherein the representation includes an image of the marker.

14. The method of claim 12, wherein the representation includes an image of information corresponding to the marker.

15. The method of claim 14, wherein the image of information includes at least one of a pattern, a picture, text, or a symbol.

16. The method of claim 12, wherein the object is determined to be a counterfeit in response to the visual representation of the marker not corresponding to the reference authentication marker for the object.

17. The method of claim 12, further comprising:
combining at least one of video or a still image of the object and the visual representation, wherein the visual representation is a computer generated representation.

18. The method of claim 12, wherein the visually obscured marker includes one or more of pattern, a color, a symbol, or a picture.

19. The method of claim 13, further comprising:
presenting information indicating that an incorrect marker has been identified when the visual representation corresponds to a marker other than the reference authentication marker for the object.

20. A non-transitory computer readable storage medium encoded with computer executable instructions, which, when executed by a processor of a computer, cause the processor to:
authenticate that an object is not a counterfeit object based on augmented reality by:
imaging the object, wherein the object includes a visually obscured marker and no encoded information, and generating an image of the object;
identifying the visually obscured marker in the image of the object; generating a combined image that includes the image of the object and a visual representation of the identified visually obscured marker; and
presenting the combined image via a display, wherein the object is authenticated as not counterfeit in response to the visual representation of the visually obscured marker corresponding to a reference authentication marker for the object.

21. The computer readable storage medium of claim 20, wherein the object is authenticated as not a counterfeit object based on an image that visibly includes both a live physical real-world image of the object and computer-generated imagery representing an identified visually obscured marker of the object.

22. The system of claim 1, wherein the marker is a combination of a fiduciary marker and one or more keys.

23. The system of claim 22, wherein the marker is a pattern formed when the one or more keys are oriented between the fiduciary marker and the imager.

24. The system of claim 22, wherein the marker is a pattern formed when the one or more keys are moved between the fiduciary marker and the imager.

* * * * *